(12) United States Patent
Amano et al.

(10) Patent No.: US 11,119,393 B2
(45) Date of Patent: Sep. 14, 2021

(54) PROJECTOR

(71) Applicant: FUJIFILM Corporation, Tokyo (JP)

(72) Inventors: Masaru Amano, Saitama (JP); Yukiko Nagatoshi, Saitama (JP); Hironobu Kayano, Saitama (JP); Kenji Ito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/887,761

(22) Filed: May 29, 2020

(65) Prior Publication Data

US 2020/0292924 A1 Sep. 17, 2020

Related U.S. Application Data

(63) Continuation of application No. PCT/JP2018/043922, filed on Nov. 29, 2018.

(30) Foreign Application Priority Data

Nov. 30, 2017 (JP) .............................. JP2017-230955

(51) Int. Cl.
*G03B 21/14* (2006.01)
*G03B 21/28* (2006.01)
*H04N 9/31* (2006.01)

(52) U.S. Cl.
CPC ........... *G03B 21/142* (2013.01); *G03B 21/28* (2013.01); *H04N 9/3102* (2013.01)

(58) Field of Classification Search
CPC .... G03B 21/14; G03B 21/006; G03B 21/008; G03B 21/142; G03B 21/28; H04N 9/31; H04N 9/3102

(Continued)

(56) References Cited

U.S. PATENT DOCUMENTS 5,800,032 A 9/1998 Uchiyama et al.
2007/0081131 A1 4/2007 Van Der Palen et al.
(Continued)

FOREIGN PATENT DOCUMENTS

CN 107193172 A 9/2017
JP 6-130353 A 5/1994
(Continued)

OTHER PUBLICATIONS

Extended European Search Report, dated Dec. 18, 2020, for European Appiication No. 18882655.6.
(Continued)

*Primary Examiner* — William C. Dowling
(74) *Attorney, Agent, or Firm* — Birch, Stewart, Kolasch & Birch, LLP

(57) ABSTRACT

A first holding barrel, a first mirror bending a first optical axis of the first holding barrel at 90°, a second holding barrel, a second mirror bending a second optical axis of the second holding barrel at 90°, and a third holding barrel are disposed on an optical axis from a screen side to an image forming panel. A first connection member connects the first holding barrel including the first mirror to the second holding barrel to be rotationally movable in increments of 90°. A second connection member connects the second holding barrel and the second mirror to the third holding barrel to be rotationally movable in increments of 90°. An orientation of a display image of the image forming panel is changed based on rotational movement states of an optical axis of a first sensor and an optical axis of a second sensor to make an orientation of a projection image on the screen match an original image.

12 Claims, 14 Drawing Sheets

(58) Field of Classification Search
USPC .................................................. 353/98, 99
See application file for complete search history.

(56) References Cited

U.S. PATENT DOCUMENTS

| | | | |
|---|---|---|---|
| 2008/0074623 | A1 | 3/2008 | Odagiri et al. |
| 2009/0033888 | A1 | 2/2009 | Nozaki et al. |
| 2009/0237620 | A1 | 9/2009 | Yamamoto et al. |
| 2010/0066986 | A1 | 3/2010 | Lin |
| 2016/0246034 | A1 | 8/2016 | Amano |
| 2016/0246037 | A1 | 8/2016 | Amano |
| 2017/0272716 | A1 | 9/2017 | Nakagawa et al. |
| 2018/0217489 | A1* | 8/2018 | Kuroda .................. G02B 13/16 |
| 2019/0086783 | A1* | 3/2019 | Kuroda .................. G03B 21/00 |
| 2019/0101816 | A1* | 4/2019 | Kuroda .............. G02B 27/0955 |
| 2019/0155128 | A1* | 5/2019 | Shimizu ................. G03B 11/00 |
| 2019/0219802 | A1* | 7/2019 | Kuroda ................ G02B 17/023 |
| 2019/0219915 | A1* | 7/2019 | Kayano .................. G02B 7/023 |
| 2019/0346750 | A1 | 11/2019 | Kuroda |
| 2020/0292923 | A1* | 9/2020 | Amano .............. G02B 27/0955 |
| 2020/0301267 | A1* | 9/2020 | Kuroda .................. G03B 21/28 |

FOREIGN PATENT DOCUMENTS

| | | |
|---|---|---|
| JP | 9-197341 A | 7/1997 |
| JP | 9-304833 A | 11/1997 |
| JP | 2002-112094 A | 4/2002 |
| JP | 2007-78806 A | 3/2007 |
| JP | 2007-515681 A | 6/2007 |
| JP | 2007-525700 A | 9/2007 |
| JP | 2008-76791 A | 4/2008 |
| JP | 2009-229563 A | 10/2009 |
| JP | 2012-37674 A | 2/2012 |
| JP | 2012-98506 A | 5/2012 |
| JP | 2012-242487 A | 12/2012 |
| JP | 2013-235215 A | 11/2013 |
| JP | 2014-157174 A | 8/2014 |
| JP | 2014-170097 A | 9/2014 |
| JP | 2016-156983 A | 9/2016 |
| JP | 2016-156986 A | 9/2016 |
| JP | 2017-129653 A | 7/2017 |
| WO | WO 2005/067621 A2 | 7/2005 |
| WO | WO 2016/104331 A1 | 6/2016 |
| WO | WP 2016/129280 A1 | 8/2016 |
| WO | WO 2016/172732 A1 | 10/2016 |
| WO | WO 2017/056925 A1 | 4/2017 |
| WO | WO 2017/169903 A1 | 10/2017 |

OTHER PUBLICATIONS

Japanese Office Action, dated Jan. 5, 2021, for corresponding Japanese Application No. 2019-216976, with an English translation.
International Preliminary Report on Patentability and Written Opinion of the International Searching Authority with an English translation (forms PCT/IB/373, PCT/ISA/237 and PCR/IB/326), dated Jun. 11, 2020, for corresponding International Application No. PCT/JP2018/043922.
International Search Report (form PCT/ISA/210), dated Feb. 12, 2019, for corresponding International Application No. PCT/JP2018/043922, with an English translation.
Chinese Office Action and Search Report for corresponding Chinese Application No. 201880077239.5, dated Apr. 27, 2021, with an English translation.

* cited by examiner

PROJECTOR

CROSS-REFERENCE TO RELATED APPLICATIONS

This application is a Continuation of PCT International Application No. PCT/JP2018/043922 filed on 29 Nov. 2018, which claims priority under 35 U.S.C § 119(a) to Japanese Patent Application No. 2017-230955 filed on 30 Nov. 2017. The above application is hereby expressly incorporated by reference, in its entirety, into the present application.

BACKGROUND OF THE INVENTION

1. Field of the Invention

The present invention relates to a projector.

2. Description of the Related Art

In recent years, a projector in which an image forming panel, such as a liquid crystal display element or a digital micromirror device (DMD: Registered Trademark), is mounted has become widespread.

Recently, with the widespread use of smartphones and the like, in addition to landscape imaging with a horizontally long imaging screen, portrait imaging with a vertically long imaging screen is also easily performed. For this reason, opportunities are increasing for projectors to project a screen in which a landscape screen and a portrait screen are mixed. There is also increasing demand for projection of a portrait screen in signage applications as advertising mediums, such as signboards.

For this reason, a projector that rotates a projection direction at 90° within a horizontal plane using a reflection mirror and switches between portrait projection with a vertically long screen and landscape projection with a horizontally long screen has been suggested (see JP2014-170097A).

SUMMARY OF THE INVENTION

However, in JP2014-170097A, the reflection mirror is externally attached to a projection lens, there is a need to use a large reflection mirror, and there is a problem in that the device is increased in size.

The invention has been accomplished in view of the above-described circumstances, and an object of the invention is to provide a projector capable of performing landscape projection and portrait projection and freely setting a projection direction without causing an increase in size.

In order to achieve the above-described object, the invention provides a projector comprising an image forming panel, a projection optical system, a first connection member 44, a first sensor, and a controller. The image forming panel displays an image based on an original image. The projection optical system has, in order from a screen side, a first optical system, a first reflection member, and a second optical system, and projects the image displayed on the image forming panel onto a screen as a magnified image. The first reflection member bends a first optical axis of the first optical system at 90°. The first connection member 44 connects the first optical system including the first reflection member to the second optical system to be rotationally movable in increments of 90° around a second optical axis of the second optical system. The first sensor detects a rotational movement state of the first optical axis of the first optical system around the second optical axis in the first connection member 44. The controller changes an orientation of a display image of the image forming panel based on the rotational movement state detected by the first sensor to make an orientation of a projection image on a projection plane match the original image.

It is preferable that the projection optical system comprises a second reflection member and a third optical system. The second reflection member bends the second optical axis of the second optical system at 90°. The third optical system is disposed on the image forming panel side from the second reflection member.

It is preferable that the projection optical system has a second connection member and a second sensor. The second connection member connects the second optical system and the second reflection member to the third optical system to be rotationally movable in increments of 90° around a third optical axis of the third optical system. The second sensor detects a rotational movement state of the second optical axis of the second optical system around the third optical axis in the second connection member. The controller changes the orientation of the display image of the image forming panel based on the rotational movement states detected by the first sensor and the second sensor to make the orientation of the projection image on the projection plane match the original image.

It is preferable that a reflection surface of each of the first reflection member and the second reflection member is a plane. It is preferable that the controller determines whether the display image is a vertically long portrait image or a horizontally long landscape image based on image orientation information to change an orientation of an image. It is preferable that the controller has an image orientation change input unit that inputs change of an image orientation.

It is preferable that the projector further comprises a projector body having the image forming panel, and a vertical shift mechanism. The vertical shift mechanism shifts the projector body in a vertical direction. It is preferable that the projector comprises a horizontal shift mechanism in addition to or instead of the vertical shift mechanism. The horizontal shift mechanism shifts the projector body in a horizontal direction. It is preferable that the projector further comprises a projector body having the image forming panel, and a rotational movement mechanism that rotationally moves the projector body around a vertical line.

According to the invention, it is simply possible to perform landscape projection and portrait projection and to freely set a projection direction without causing an increase in size.

DESCRIPTION OF THE PREFERRED EMBODIMENTS

First Embodiment

Figure 1:
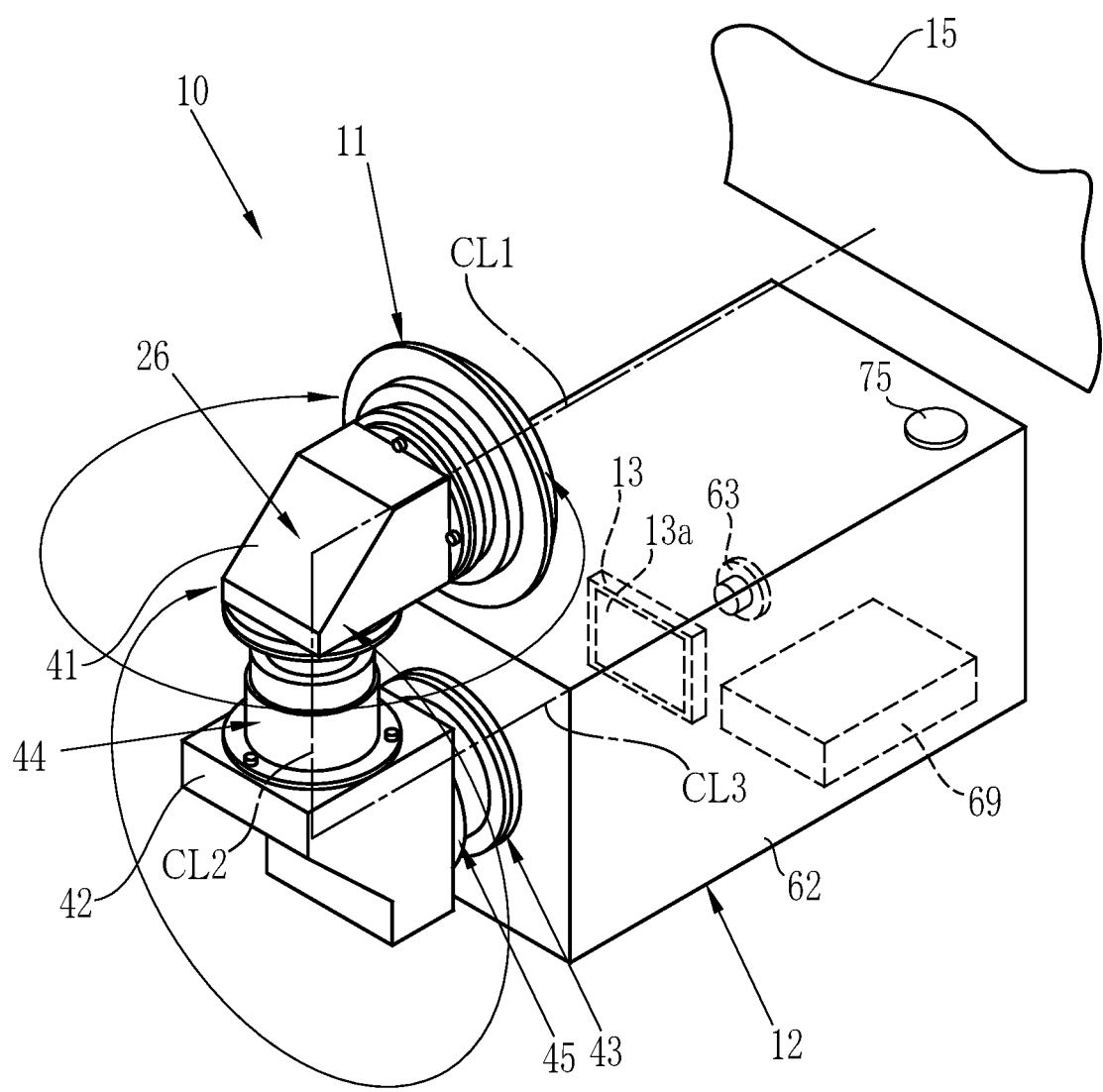
FIG. 1 is a perspective view showing a projector of the invention.

As shown in FIG. 1, a projector 10 of the embodiment comprises a projection optical system 11 and a projector body 12. The projector body 12 has an image forming panel 13. An image is displayed on an image display surface 13a of the image forming panel 13 based on an original image. The projection optical system 11 projects the image displayed on the image forming panel 13 onto a screen 15 as a magnified image.

Figure 2:
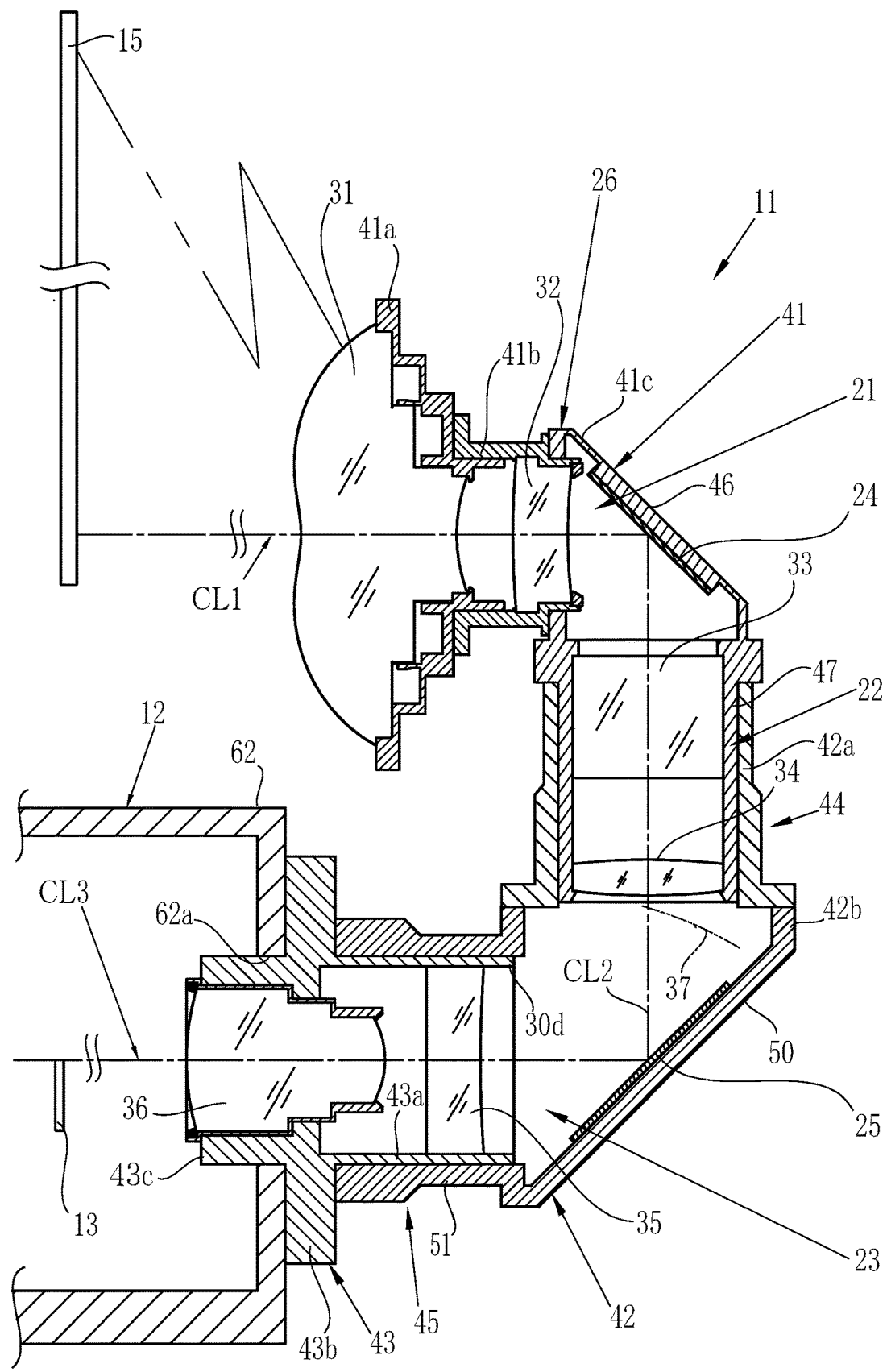
FIG. 2 is a longitudinal sectional view of the projector.

As shown in FIG. 2, the projection optical system 11 comprises, in order on an optical axis from the screen 15 to the image forming panel 13, a first optical system 21 having a first optical axis CL1, a second optical system 22 having a second optical axis CL2, and a third optical system 23 having a third optical axis CL3. In the embodiment, an up-down direction, a right-left direction, and a front-rear direction are determined based on a state in which the projector body 12 turns a projection direction in a direction of the third optical axis CL3.

A first mirror 24 as a first reflection member is disposed between the first optical system 21 and the second optical system 22. The first mirror 24 has a reflection surface that is a plane, and bends the first optical axis CL1 of the first optical system 21 through reflection to form the second optical axis CL2 that intersects the first optical axis CL1 at 90°. A second mirror 25 as a second reflection member is disposed between the second optical system 22 and the third optical system 23. The second mirror 25 has a reflection surface that is a plane, and bends the second optical axis CL2 through reflection to form the third optical axis CL3 that intersects the second optical axis CL2 at 90°.

The first optical system 21 has a first lens 31 and a second lens 32 in order on the first optical axis CL1 from the screen 15 to the image forming panel 13. The second optical system 22 has a third lens 33 and a fourth lens 34 on the second optical axis CL2. The third optical system 23 has a fifth lens 35 and a sixth lens 36 on the third optical axis CL3. Although each of the first lens 31, the second lens 32, the third lens 33, the fifth lens 35, and the sixth lens 36 is shown as a single lens for simplification of illustration, each lens actually consists of a plurality of lens groups. The sixth lens 36 and the fifth lens 35 image illumination light from the image forming panel 13 on an imaging plane 37 as an intermediate image. The fourth lens 34, the third lens 33, the second lens 32, and the first lens 31 project the image of the imaging plane 37 onto the screen 15 on a magnified scale.

The first optical system 21, the second optical system 22, the third optical system 23, the first mirror 24, and the second mirror 25 are stored in a lens barrel 26. The lens barrel 26 has a first holding barrel 41, a second holding barrel 42, a third holding barrel 43, a first connection member 44, and a second connection member 45, and the members 41 to 45 are assembled integrally.

The first holding barrel 41 has a first lens frame 41a, a second lens frame 41b, and a first mirror frame 41c. The first lens frame 41a is formed in a cylindrical shape, and the first lens 31 is fixed to the first lens frame 41a. The second lens frame 41b is formed in a cylindrical shape, and the second lens 32 is fixed to the second lens frame 41b. The first mirror frame 41c is formed in an angular tubular shaped having an inclined surface 46, and has a connection barrel 47 in a lower portion. The first mirror 24 is fixed to the inner surface of the inclined surface 46, and the third lens 33 and the fourth lens 34 are fixed to the connection barrel 47.

The second holding barrel 42 has a connection barrel member 42a and a second mirror frame 42b. The connection barrel member 42a is externally fitted to the connection barrel 47 of the first holding barrel 41, and both of the connection barrel member 42a and the connection barrel 47 are rotationally movably connected. The first connection member 44 is constituted by the fitting structure of the connection barrel member 42a and the connection barrel 47. The second mirror frame 42b is formed in an angular tubular shape having an inclined surface 50, and has a connection barrel 51 in a side portion. The second mirror 25 is fixed to the inner surface of the inclined surface 50.

The third holding barrel 43 is formed in a stepped cylindrical shape, and has a fourth lens frame 43a, a flange 43b, and a fifth lens frame 43c. The fifth lens 35 is fixed to the fourth lens frame 43a. The fourth lens frame 43a is internally fitted to the connection barrel 51 of the second holding barrel 42, and both of the fourth lens frame 43a and the connection barrel 51 are rotationally movably connected. The second connection member 45 is constituted by the fitting structure of the fourth lens frame 43a and the connection barrel 51 of the second holding barrel 42. The flange 43b is fixed to a lens mounting hole 62a of a housing 62. The sixth lens 36 is fixed to the fifth lens frame 43c.

The first connection member 44 connects the first holding barrel 41 to the second holding barrel 42 to be rotationally movable in increments of 90° around the second optical axis CL2 of the second optical system 22. Similarly, the second connection member 45 connects the second holding barrel 42 to the third holding barrel 43 to be rotationally movable in increments of 90° around the third optical axis CL3 of the third optical system 23. For this reason, the first connection member 44 is provided with a first click mechanism and a first sensor 55 (see FIG. 3). The second connection member 45 is provided with a second click mechanism and a second sensor 56 (see FIG. 3). The first connection member 44 and the second connection member 45 should rotationally movably connect both members, and various rotationally movable guide mechanisms can be used.

The first click mechanism is constituted of a known click mechanism. The first click mechanism is configured such that one protrusion is locked to another storage portion each time the first holding barrel 41 is rotationally moved at 90° with respect to the second holding barrel 42. With this, the rotational movement of the first holding barrel 41 is regulated in increments of 90°. Then, the first holding barrel 41 is rotationally moved with force beyond the rotational movement regulation, whereby the first click mechanism is unlocked, and next rotational movement is possible. In a case where the first holding barrel 41 is further rotationally moved at 90° in this state, rotational movement is regulated at a next click position.

The first sensor 55 detects a rotational movement state of the first optical axis CL1 of the first optical system 21 around the second optical axis CL2 in the first connection member 44. The rotational movement state refers to four states of an initial position where the first optical axis CL1, the second optical axis CL2, and the third optical axis CL3 are in a U shape, a 90° position rotationally moved clockwise at 90° from the initial position, a 180° position further rotationally moved clockwise at 90° from the 90° position, and a 270° position further rotationally moved clockwise at 90° from the 180° position. Although a mechanical sensor is used as the first sensor 55, an optical sensor, a detection sensor of a rotational movement angle by a rotary encoder, or the like may be used.

The second click mechanism regulates rotational movement of the second holding barrel 42 each time the second holding barrel 42 is rotationally moved at 90° with respect to the third holding barrel 43. As the second click mechanism, similarly to the first click mechanism, a known click mechanism is used. The first connection member 44 and the second connection member 45 have rotational movement regulation members, respectively. The rotational movement regulation members regulate rotational movement beyond 360° in the respective connection members 44 and 45.

The lens configuration of the first lens 31 to the sixth lens 36 is described in detail, for example, in "Projection Optical System and Projection Display Device" of JP2016-156986A (corresponding to US2016/246037A1), JP2016-156983A (corresponding to US2016/246034A1), or the like. The optical systems described in the documents can be used as the projection optical system 11. With the projection optical systems and the projection display devices, an optical system having high projection performance of which aberrations are satisfactorily corrected at a wide angle is obtained.

As shown in FIG. 1, the projector body 12 has a light source 63, an image forming panel 13, and a controller 69 stored in the housing 62 substantially having a rectangular parallelepiped shape. The projector body 12 has a square longitudinal section and is formed in a rectangular parallelepiped shape as a whole to have a size in which the corners of the projector body 12 are positioned inside the rotational movement range of the first holding barrel 41 around the third optical axis CL3. Accordingly, even though the second holding barrel 42 is rotationally moved, the first holding barrel 41 does not come into contact with the projector body 12.

As the image forming panel 13, for example, a transmissive liquid crystal panel is used. The light source 63 is disposed on a rear surface of the image forming panel 13, that is, on an opposite side of the image forming panel 13 from the projection optical system 11. The light source 63 uses a light emitting diode (LED) that emits light of three colors of red (R), green (G), and blue (B) simultaneously, and illuminates the image forming panel 13. Instead of an LED, a xenon lamp, a halogen lamp, an ultra-high pressure mercury lamp, or the like that emits white light may be used. The projection optical system 11 projects illumination light from the image forming panel 13 illuminated by the light source 63 onto the screen 15.

Figure 3:
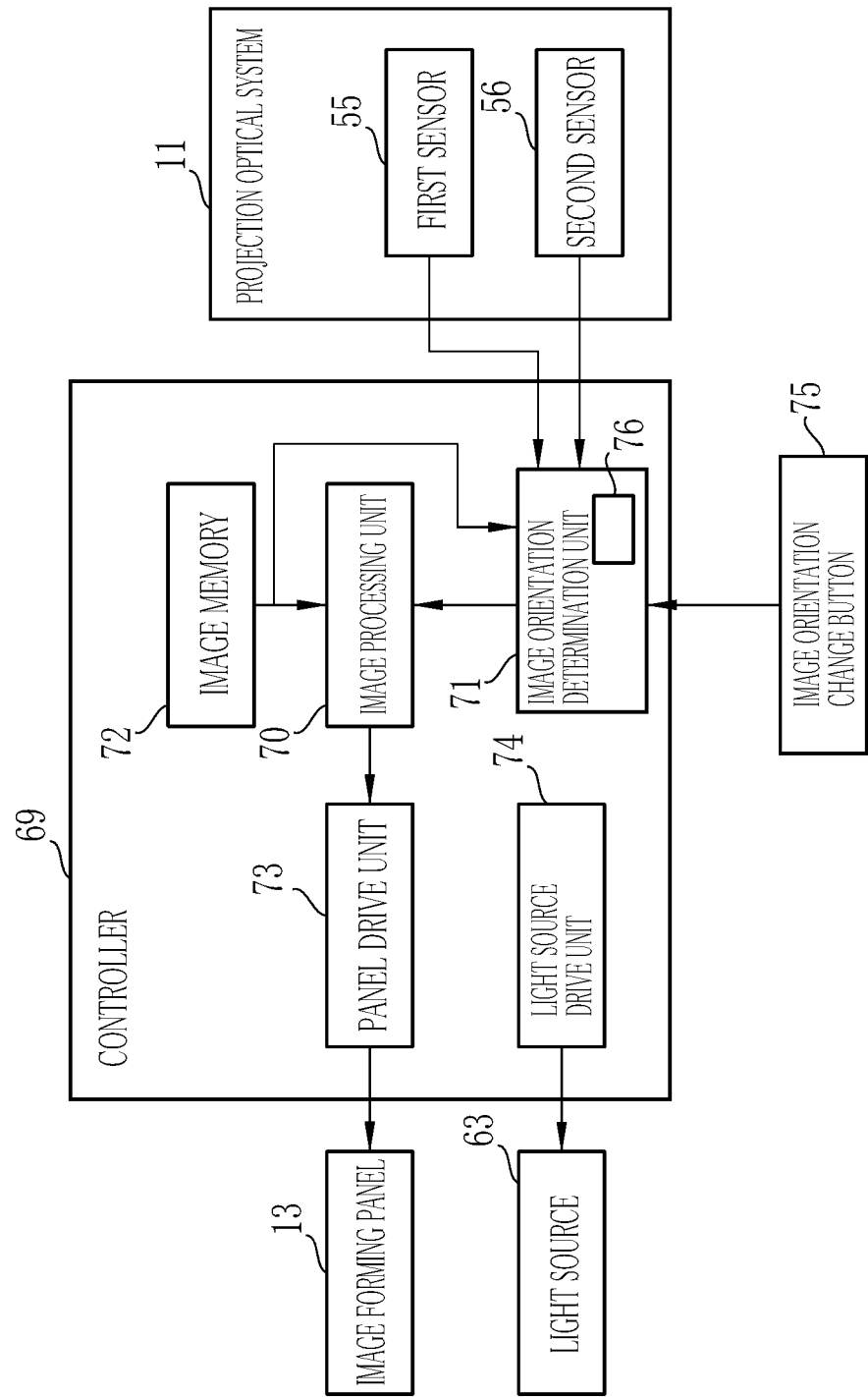
FIG. 3 is a control block diagram.

As shown in FIG. 3, the controller 69 has an image processing unit 70, an image orientation determination unit 71, an image memory 72, a panel drive unit 73, a light source drive unit 74, and an image orientation change button 75 as an image orientation change input unit. The image processing unit 70 executes image processing on a projection image from the image memory 72 and sends an image signal to the panel drive unit 73. The panel drive unit 73 drives the image forming panel 13 based on the image signal to display an image of three colors of RGB on the image display surface 13a. The light source drive unit 74 turns on the light source 63.

The image orientation determination unit 71 corrects an orientation of an image displayed on the image forming panel 13 based on signals of the first sensor 55 and the second sensor 56. In a case where the image orientation change button 75 is pressed, the image orientation determination unit 71 sequentially changes the orientation of the image.

Figure 4:
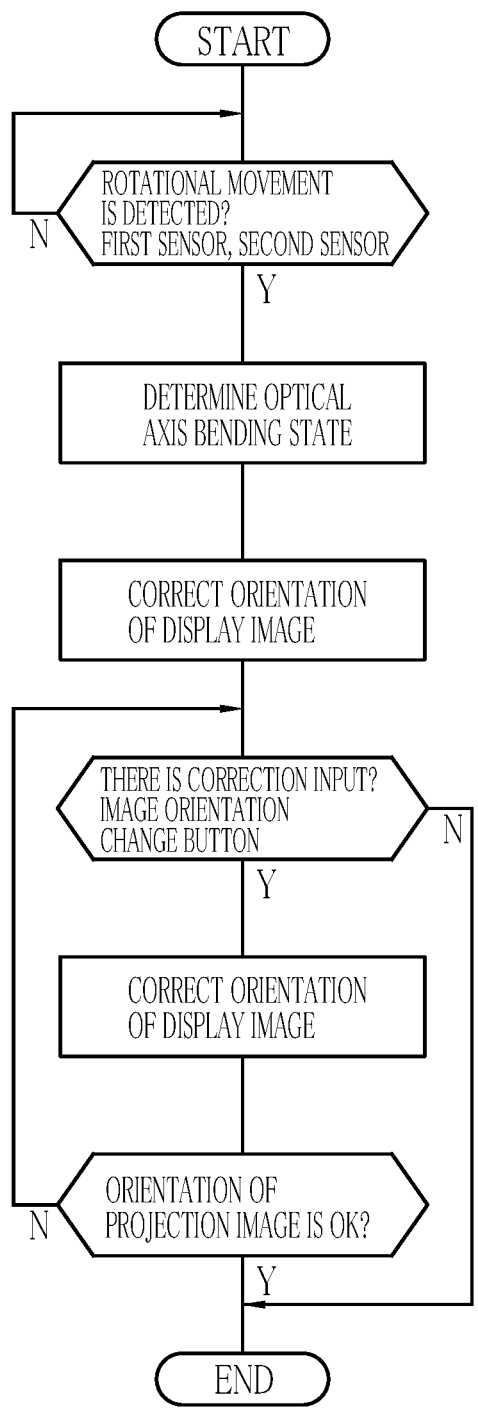
FIG. 4 is a flowchart of orientation correction of a display screen.

FIG. 4 is a flowchart showing image orientation correction in the controller 69. The image orientation determination unit 71 detects an optical axis bending state of the projection optical system 11 based on the signals of the first sensor 55 and the second sensor 56. As shown in a second row of a table of FIG. 6, a relationship between a panel display image E1, which is displayed on the image forming panel 13, and an orientation of each of projection images E21 to E24 of the screen 15 in a bending state of the projection optical system 11 is known in advance. Accordingly, the bending state of the projection optical system 11 is specified from among 16 patterns shown in FIG. 5 based on rotational movement detection states from the first sensor 55 and the second sensor 56. Then, as shown in the table of FIG. 6, an image orientation correction value is specified based on the specified bending pattern, and the specified image orientation correction value is sent to the image processing unit 70. The image processing unit 70 changes an orientation of an original image E0 based on the image orientation correction value, and displays panel display images E1 and E11 to E18 on the image forming panel 13. The panel display images E1 and E11 to E18 are changed in orientation by the two mirrors 24 and 25 to have the same orientation as the original image E0 and are projected onto the screen 15. For this reason, the image orientation determination unit 71 has table data 76 as the table of FIG. 6 that stores an optical axis bending state of the projection optical system 11 in association with an orientation correction value of an image, which is displayed on the image forming panel 13 in the bending state.

Figure 5:
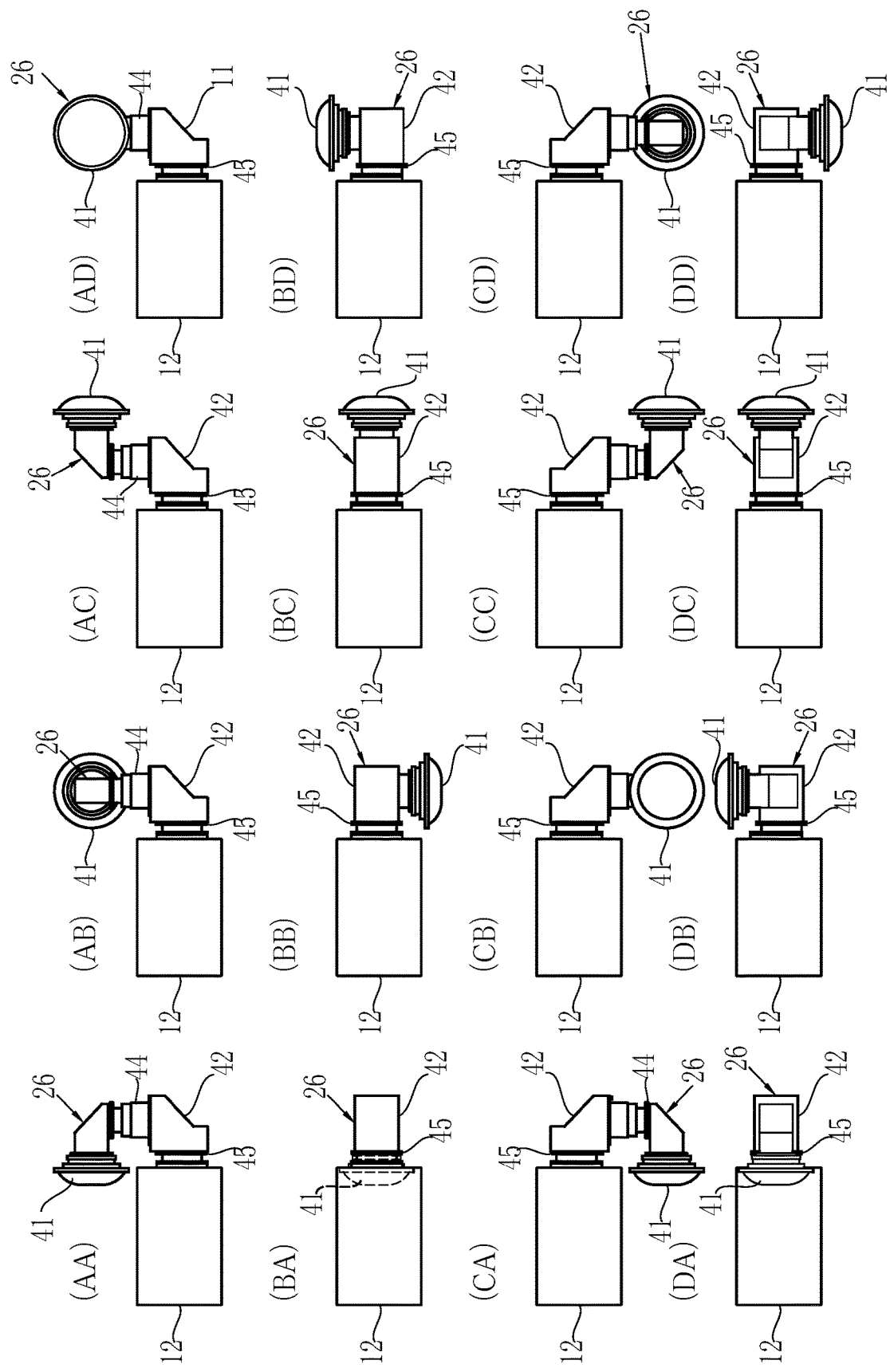
FIG. 5 is a side view showing a bending pattern of a projection optical system.
Figure 6:
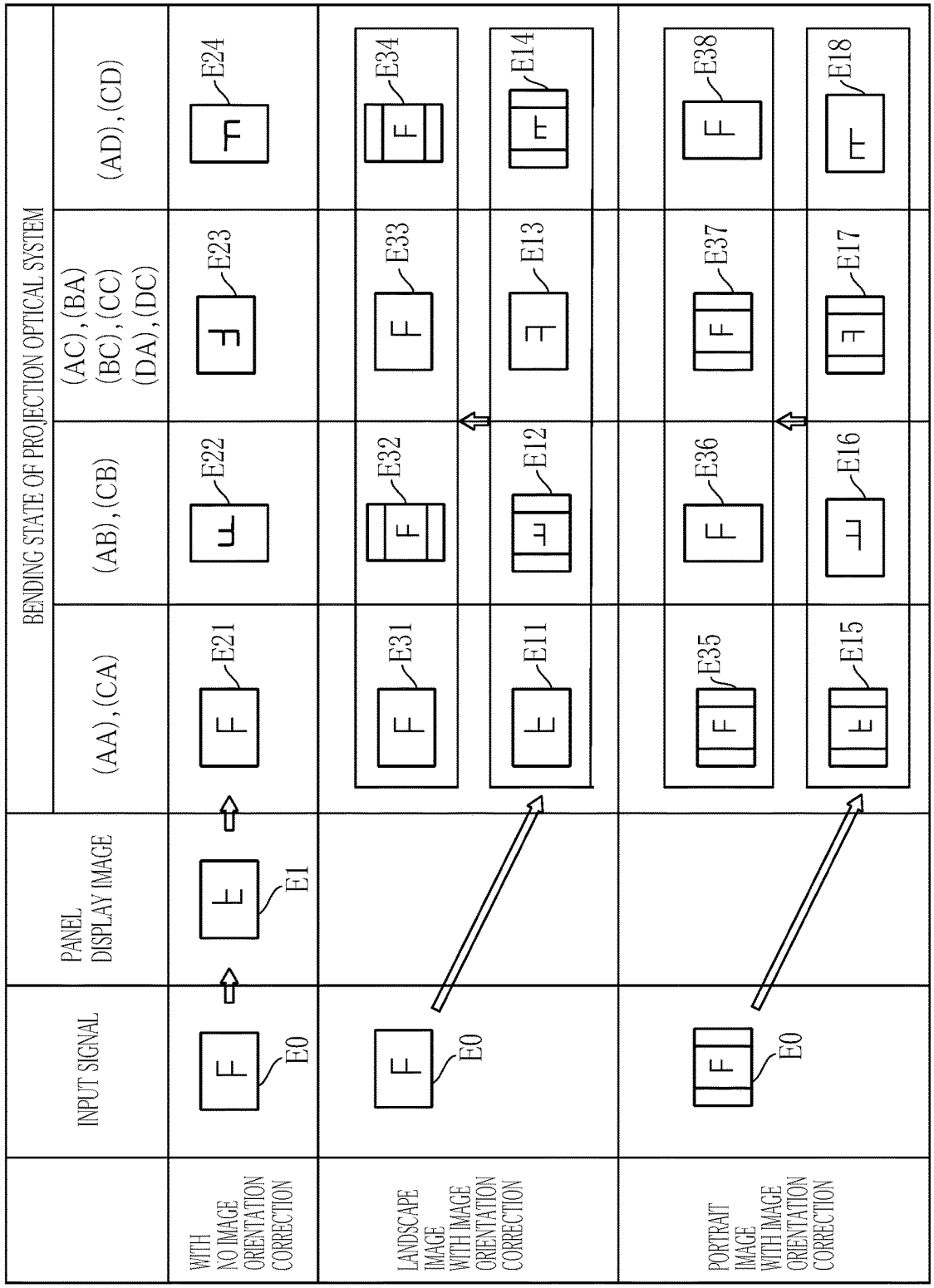
FIG. 6 is a table illustrating the orientation correction of the display screen.

FIG. 5 shows all bending patterns of the projection optical system 11 that are obtained when the first holding barrel 41 and the second holding barrel 42 are individually rotationally moved in increments of 90° using the first connection member 44 and the second connection member 45. A state of the projection optical system 11 of a bending pattern (AA) is an initial state, and the optical axis is bent in a U shape. The bending patterns obtained when the first holding barrel 41 is rotationally moved in order in increments of 90° clockwise from (AA) with respect to the second holding barrel 42 are (AB), (AC), and (AD). The bending patterns obtained when the first holding barrel 41 is similarly rotationally moved in order in increments of 90° clockwise from (BA) are (BB), (BC), and (BD), the bending patterns obtained when the first holding barrel 41 is similarly rotationally moved in order in increments of 90° clockwise from (CA) are (CB), (CC), and (CD), and the bending patterns obtained when the first holding barrel 41 is similarly rotationally moved in order in increments of 90° clockwise from (DA) are (DB), (DC), and (DD).

The bending patterns obtained when the second holding barrel 42 is rotationally moved in order in increments of 90° clockwise from (AA) with respect to the third holding barrel 43 are (BA), (CA), and (DA). The bending patterns obtained when the second holding barrel 42 is similarly rotationally moved in order in increments of 90° clockwise from (AB) are (BB), (CB), and (DB). The bending patterns obtained when the second holding barrel 42 is similarly rotationally moved in order in increments of 90° clockwise from (AC) are (BC), (CC), and (DC). The bending patterns obtained when the second holding barrel 42 is similarly rotationally moved in order in increments of 90° clockwise from (AD) are (BD), (CD), and (DD). In this way, the 16 bending state patterns of (AA) to (DD) can be constituted by the first connection member 44 and the second connection member 45.

FIG. 6 is a table showing change in an image orientation in the respective bending patterns (AA) to (DD). In the bending form of (AA), in order to make the orientation of the projection image E21 of the screen 15 be the same as the original image E0, an image formed by rotating the original image E0 at 180° as a mirror image is displayed on the image forming panel 13 as the panel display image E1. In a case where the first holding barrel 41 is rotationally moved in increments of 90° in a state in which the orientation of the image is unchanged and orientation correction is not performed, the panel display image is rotated like the screen projection images E21 to E24 in the second row of the table of FIG. 6.

For example, the screen projection image E22 becomes a portrait image rotated counterclockwise at 90° in (AB), the screen projection image E23 becomes an upside-down landscape image rotated counterclockwise at 180° in (AC), and the screen projection image E24 becomes a portrait image rotated counterclockwise at 270° in (AD). Accordingly, it is not preferable that the original image E0 is projected onto the screen 15 in a rotated state like the screen projection images E22, E23, and E24. Therefore, the image is displayed in a state in which the orientation of the image is corrected like the panel display images E11, E12, E13, and E14 in a lower section of a third row of the table of FIG. 6. With this, as in an upper section of the third row, screen projection images E31, E32, E33, and E34 with the same orientation (the top, bottom, right, and left are the same) of the original image E0 are displayed. The image forming panel 13 is in landscape in (AB) and (CB) or (AD) and (CD). For this reason, the screen projection images E32 and E34 are displayed on a reduced scale because a horizontal side length of the original image is displayed in alignment with a vertical side length of the image forming panel 13.

A fourth row of the table of FIG. 6 shows correction in a case where the original image is a portrait image. As shown in a lower section of the fourth row, correction is performed to the panel display images E15, E16, E17, and E18 formed by correcting the orientation of the display image of the image forming panel 13, whereby screen projection images E35, E36, E37, and E38 are displayed as an image with the same orientation as the original image E0 as shown in an upper section of the fourth row.

Projection toward a floor is performed in (BB) and (DD), and projection toward a ceiling is performed in (BD) and (DB). In such projection toward the ceiling or the floor, since the orientation of the projection image is changed depending on a portion to be a reference, in the embodiment, the correction of the image orientation is not particularly performed. However, the correction of the image orientation may be arbitrarily performed.

In a case where the orientation of the screen projection image is desired to be changed, the image orientation change button 75 is operated. In a case where the image orientation change button 75 is pressed, the orientation of the panel display image E1 displayed on the image forming panel 13 is sequentially changed for each one operation. For example, the panel display images E11 to E14 shown in the lower section of the third row of the table of FIG. 6 or the panel display images E15 to E18 shown in the lower section of the fourth row of the table of FIG. 6 are sequentially displayed on the image forming panel 13.

Next, the operation of the embodiment will be described. In a case where the projection direction should be changed, a user holds the first holding barrel 41 and rotationally moves the first holding barrel 41 around the second optical axis CL2 with the first connection member 44. The user holds the second holding barrel 42 to rotationally move the second holding barrel 42 around the third optical axis CL3 with the second connection member 45. With the rotational movement operations, as shown in FIG. 5, it is possible to change the projection optical system 11 in the 16 bending patterns (AA) to (D), and arbitrarily change the projection direction.

In FIG. 5, the bending pattern (AA) becomes an upper rear projection position, (BA) and (DA) becomes a middle rear projection position, (CA) becomes a lower rear projection position, (AB) becomes an upper left projection position, (BB) becomes a lower bottom projection position, (CB) becomes a lower right projection position, (DB) becomes an upper top projection position, (AC) becomes an upper front projection position, (BC) and (DC) become a middle front projection position, (CC) becomes a lower front projection position, (AD) becomes an upper right projection position, (BD) becomes an upper top projection position, (CD) becomes a lower left projection position, and (DD) becomes a lower bottom projection position. Then, with the image orientation correction by the image orientation determination unit 71 and the image processing unit 70, the projection image onto the screen 15 is projected constantly in the same orientation as the original image. In a case where a portrait image is mixed in the original image in addition to a landscape image, it is possible to press the image orientation change button 75 to sequentially change the orientation of the projection image.

As described above, in the embodiment, in a case where the first holding barrel 41 is rotated in increments of 90° by the first connection member 44 or the second holding barrel 42 is rotated in increments of 90° by the second connection member 45, it is possible to simply change the projection direction. Besides, even though the projection direction is changed, with the image orientation correction by the image orientation determination unit 71 and the image processing unit 70, it is possible to display the image in the same orientation as the original image E0 like the screen projection images E31 to E38 shown in FIG. 6.

Modification Example 1

In the above-described embodiment, although the original image is displayed and the orientation of the screen projection image is corrected with a manual operation while automatic determination regarding whether the display image is a landscape image or a portrait image is not performed, instead or in addition, as shown in FIG. 3, determination may be made whether or not the display image is a landscape image or a portrait image using image orientation information of the original image from the image memory 72, and accordingly, the image orientation correction may be automatically performed as shown in the table of FIG. 6.

Modification Example 2

Figure 7:
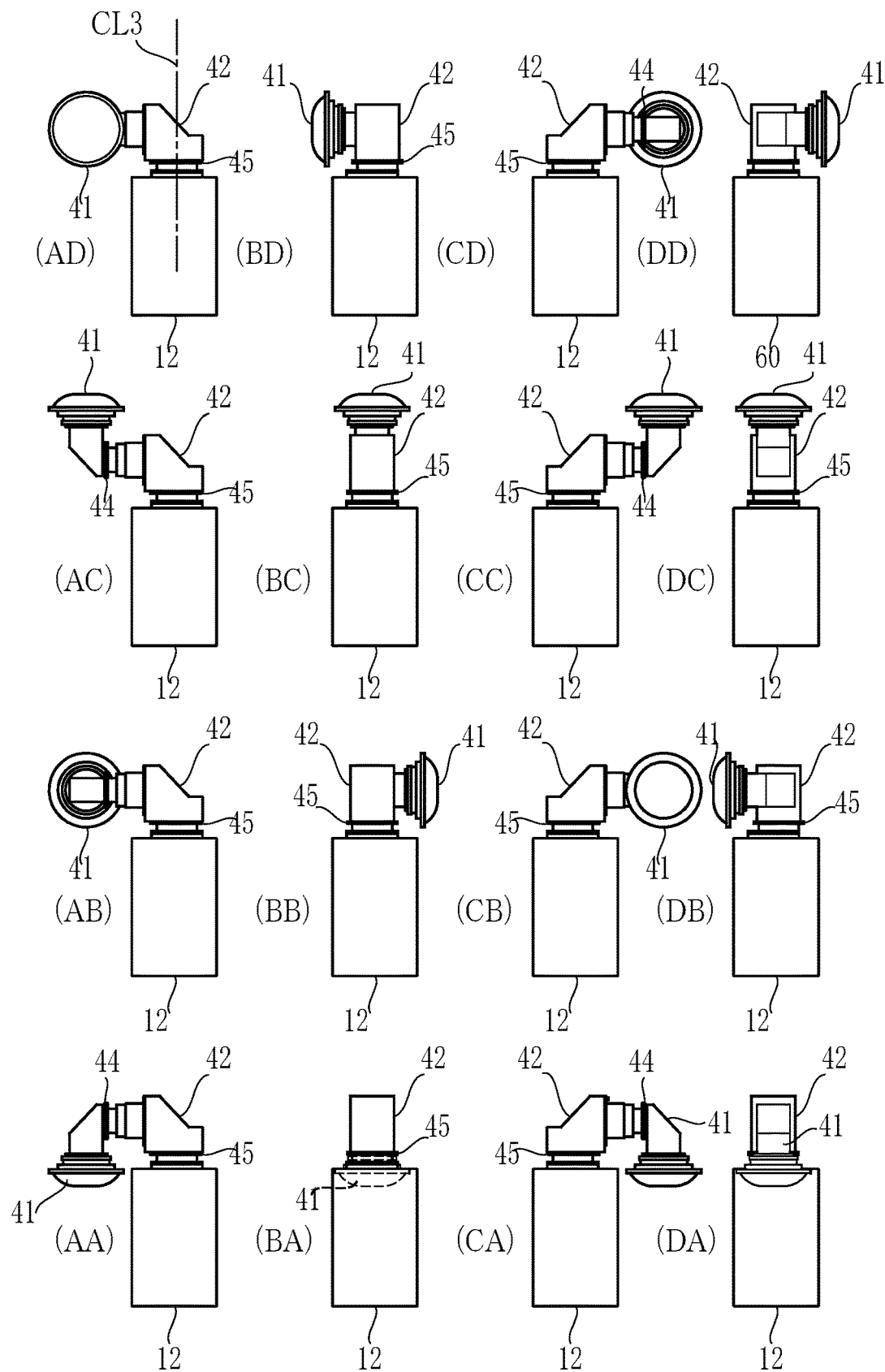
FIG. 7 is a side view showing a bending pattern of a projection optical system in a projector of Modification Example 1 in which a third optical axis is arranged in a vertical direction.
Figure 8:
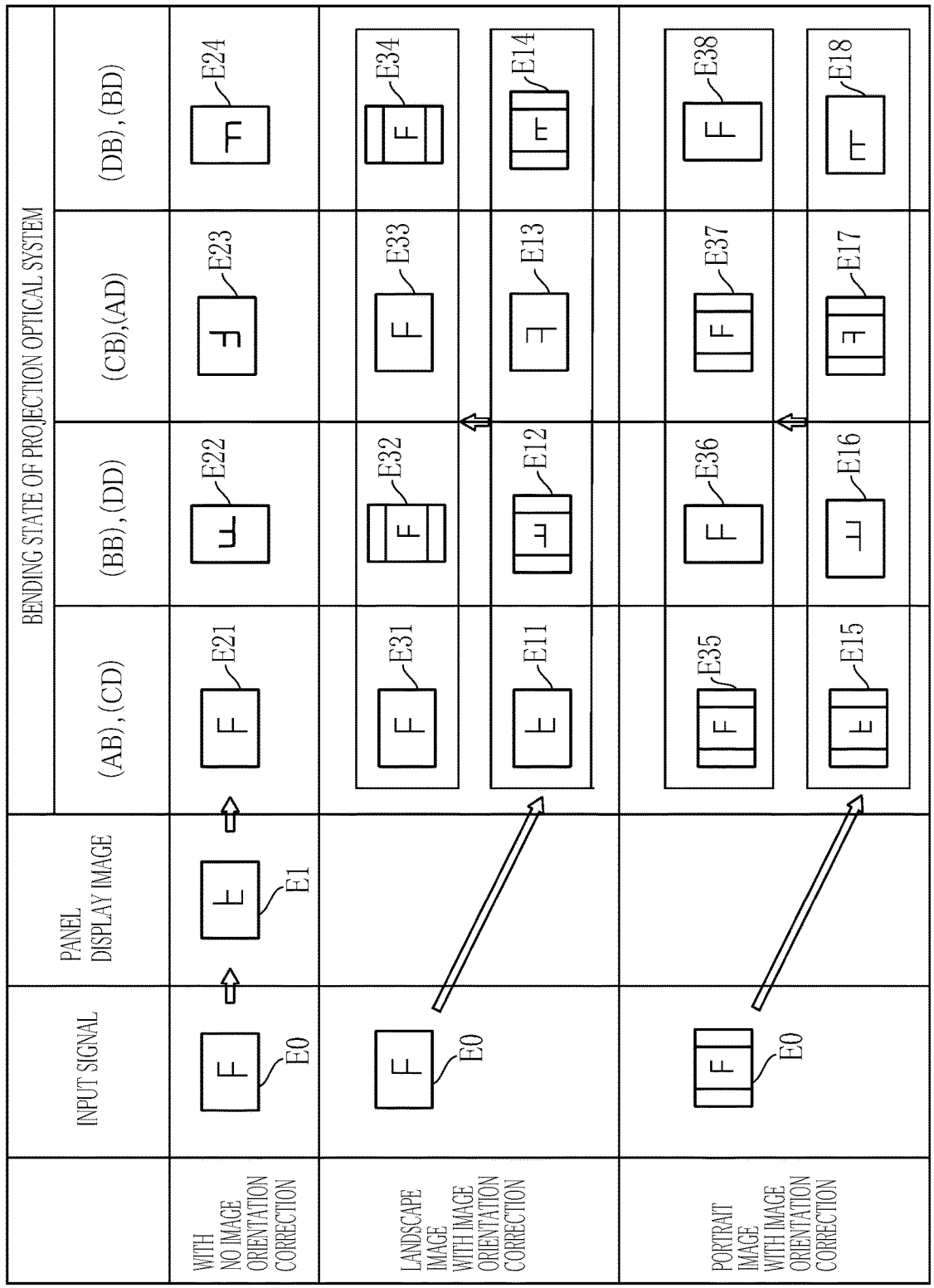
FIG. 8 is a table illustrating orientation correction of a display screen of Modification Example 1.

In the above-described embodiment, although an example where the projector is provided in such a manner that the second optical axis CL2 is arranged in the vertical direction has been described, as in Modification Example 2 shown in FIGS. 7 and 8, the projector may be provided in such a manner that the third optical axis CL3 is arranged in the vertical direction. FIG. 7 shows the same arrangement as the horizontal arrangement of FIG. 5 excluding that the projector is arranged vertically, and as in FIG. 5, 16 kinds of bending patterns (AA) to (DD) obtained. In this case, as shown in a table of FIG. 8, it is also possible to simply change the projection direction.

In the above-described embodiment, although the image forming panel is disposed eccentrically with respect to the third optical axis CL3, the third optical axis CL3 may be projected in alignment with a center position of the projection image of the image forming panel 13. One or both of the image forming panel 13 and the projection optical system 11 may be shifted by a shift mechanism in a direction perpendicular to the third optical axis CL3.

In the above-described embodiment, the second optical axis is made to be rotationally movable in the whole circumferential direction of the third optical axis CL3 using the housing 62 substantially in a rectangular parallelepiped shape having a square longitudinal section. Instead, though not shown, the invention may be carried out to a projector in which a projection optical system is disposed in a deflected manner on one side surface of a rectangular housing having a square longitudinal section because of the arrangement of a light source and the like. In this case, while the housing and the first optical system interfere with each other, and the projection direction is restricted as much, it is possible to perform portrait projection and landscape projection.

Second Embodiment

Figure 9:
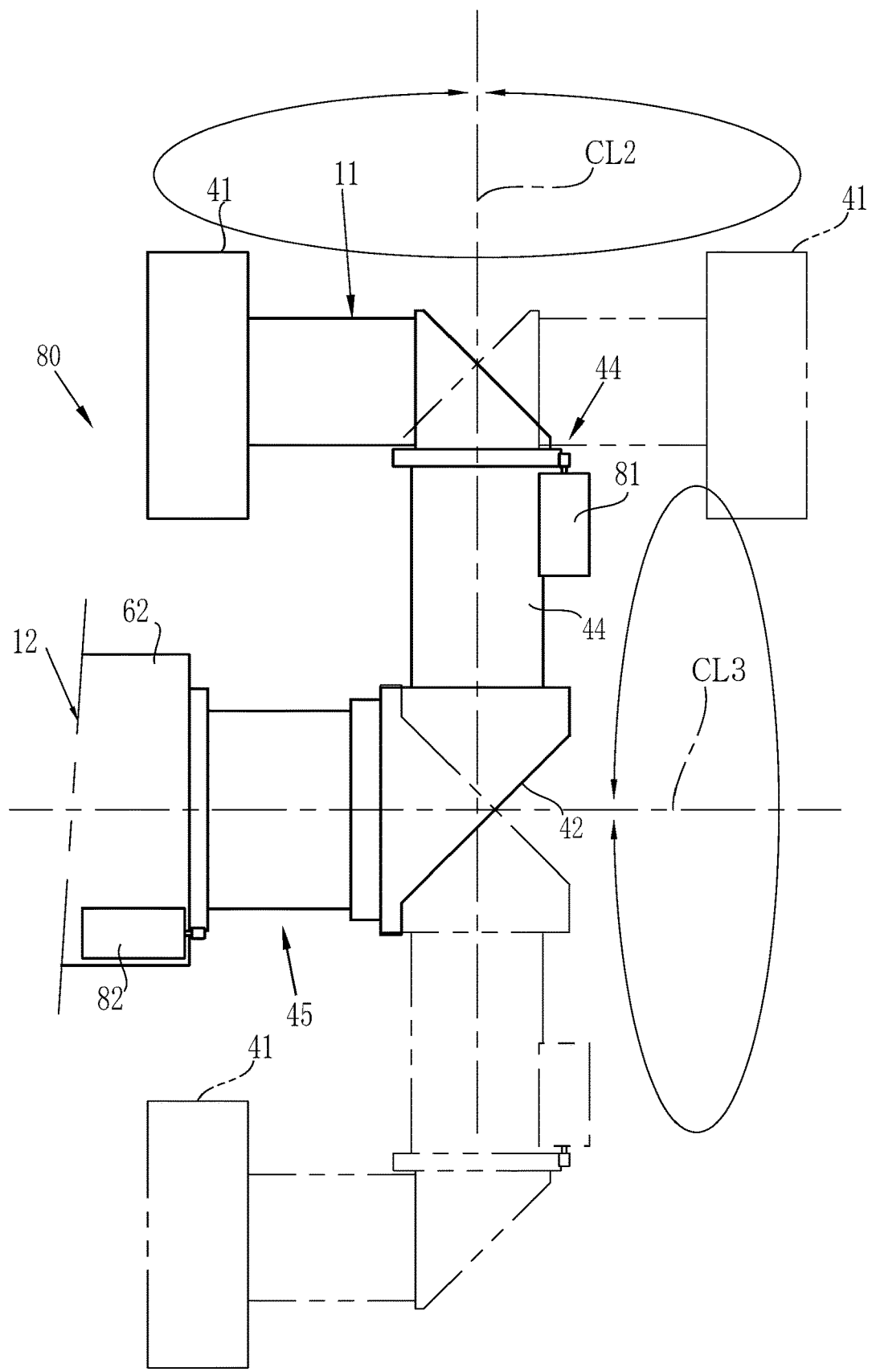
FIG. 9 is a side view of a second embodiment having a first connection member and a second connection member by motor drive.
Figure 10:
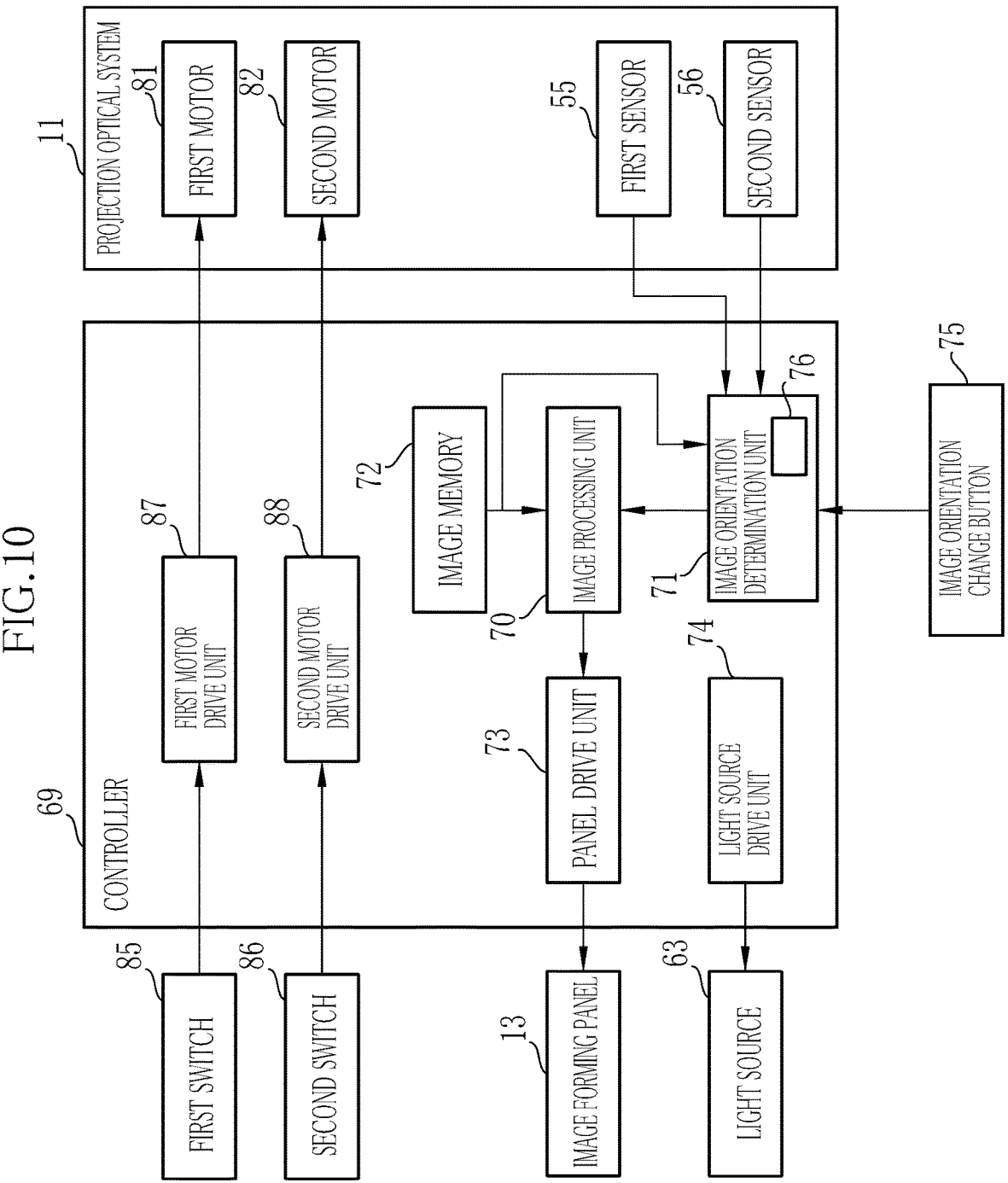
FIG. 10 is a control block diagram in the second embodiment.

In the above-described embodiment, although the first holding barrel 41 or the second holding barrel 42 is rotationally moved manually, instead, in a projector 80 of a second embodiment shown in FIGS. 9 and 10, the first connection member 44 and the second connection member 45 are rotationally moved by gear drive of a first motor 81 and a second motor 82.

In the following embodiment, the same constituent members as those in the first embodiment are represented by the same reference numerals, and overlapping description will not be repeated. In the second embodiment, a first switch 85 and a second switch 86 are connected to a controller 79. The first motor 81 is rotated by a first motor drive unit 87 with an operation of the first switch 85. With this, the first connection member 44 is rotated, whereby the orientation of the first optical system 21 can be changed.

The second motor 82 is rotated by a second motor drive unit 88 with an operation of the second switch 86. With this, the second holding barrel 42 is rotated, whereby the orientation of the second optical system 22 can be changed.

The first sensor 55 and the second sensor 56 may be omitted. In this case, for example, the number of drive pulses corresponding to an amount of rotation of each of the motors 81 and 82 is counted to detect a rotational movement angle of the first optical system 21 or the second optical system 22. Instead of or in addition to counting the number of drive pulses of each of the motors 81 and 82, a rotational movement angle of a gear may be detected by a rotation detection plate and a sensor (not shown). In this case, for example, the rotation detection plate having a number of notches at given pitches is fixed to an outer circumferential surface of the gear, and passing of a large number of notches is detected by a photointerrupter to obtain the rotational movement angle.

Third Embodiment

Figure 11:
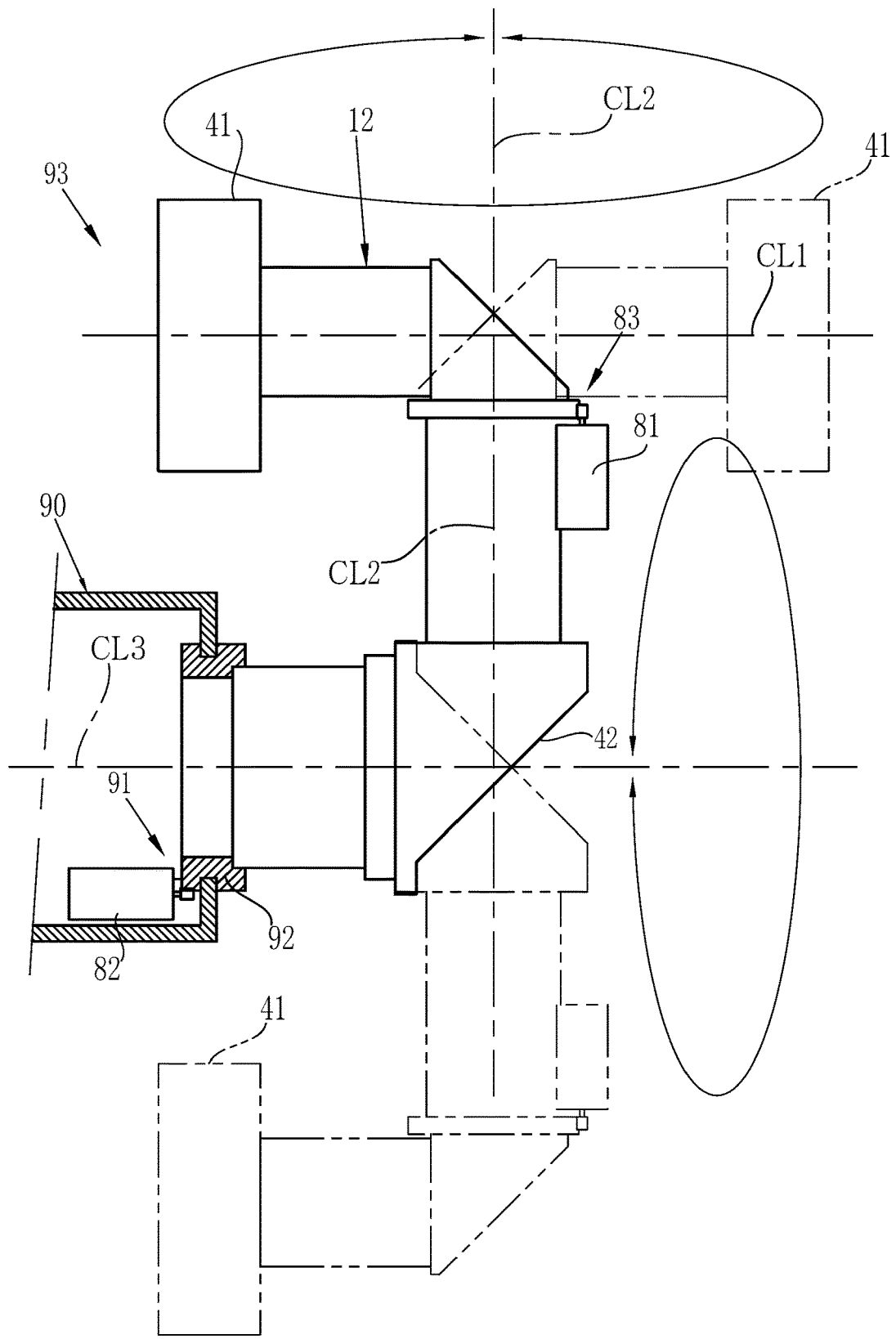
FIG. 11 is a side view of a third embodiment having a second connection member on a projector body side.

In the second embodiment, although the second holding barrel 42 is held by the second connection member 45 to be rotationally movable with respect to the third holding barrel 43, instead of the second connection member 45, as in a third embodiment shown in FIG. 11, a mount rotational movement unit 91 may be provided in a projector body 90. The mount rotational movement unit 91 has the same basic configuration as the second connection member 45, and the same constituent members are represented by the same reference numerals. In the third embodiment, a mount 92 is rotated by a motor 82, whereby the second holding barrel 42 can be rotated around the third optical axis CL3.

Fourth Embodiment

Figure 12:
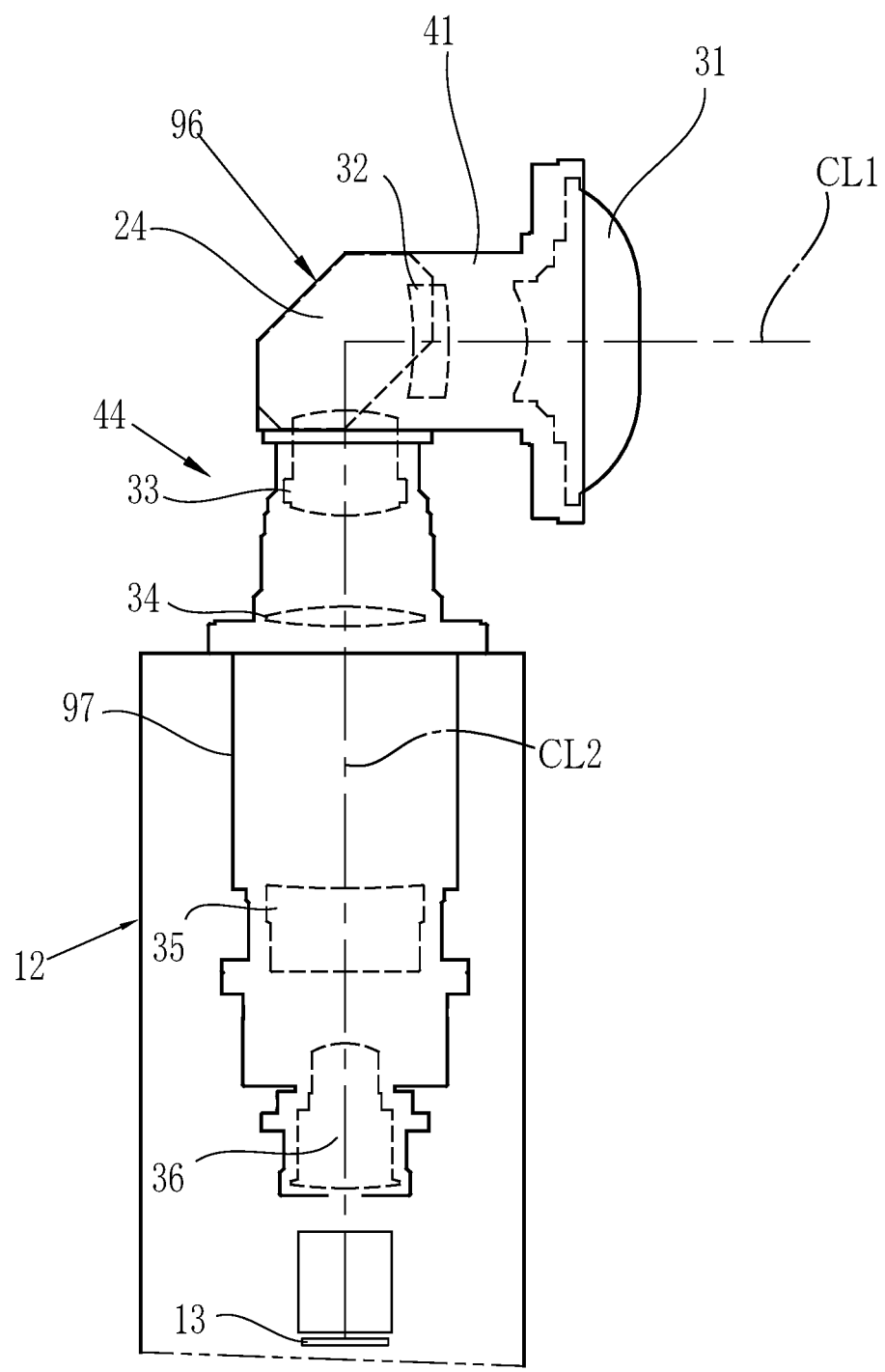
FIG. 12 is a side view showing a projector of a fourth embodiment using one mirror.

In the first embodiment, although the two mirrors 24 and 25 are used, in a projector of a fourth embodiment shown in FIG. 12, the second mirror 25 is removed and only the first mirror 24 is used, thereby constituting a projection optical system 96 in which an optical axis is in an L shape. For this reason, a cylindrical second holding barrel 97 is provided instead of the second holding barrel 42 of the first embodiment substantially formed of a rectangular parallelepiped angular tube. The configuration of the fourth embodiment is the same as in the first embodiment excluding that the second mirror 25 of the first embodiment is removed and the second holding barrel 97 is formed in a cylindrical shape, and the same constituent members as those in the first embodiment are represented by the same reference numerals.

Fifth Embodiment

Figure 13:
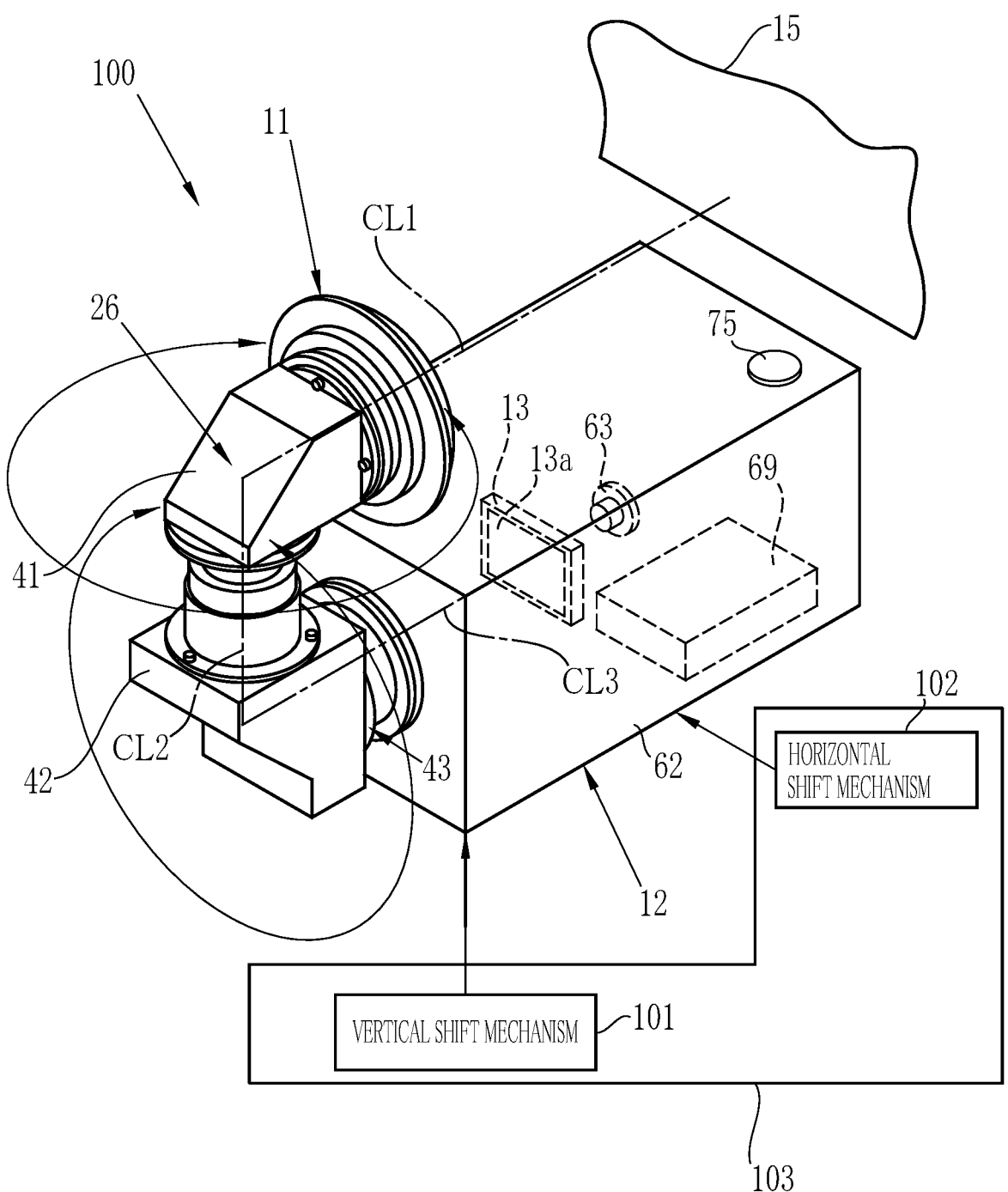
FIG. 13 is a perspective view showing a projector of a fifth embodiment that comprises a pedestal having a shift mechanism.

In the first embodiment, the projection position of the projection image fluctuates with change in bending state of the projection optical system 11. In order to avoid the fluctuation, in a projector 100 of a fifth embodiment shown in FIG. 13, a projector body 12 is shifted using a pedestal 103 having shift mechanisms 101 and 102, thereby eliminating the fluctuation of the projection position. For this reason, change in projection position by the first connection member 44 and the second connection member 45, the projector body 12 is shifted a vertical shift mechanism 101 and a horizontal shift mechanism 102 by an amount of movement of the projection position. It is possible to eliminate the movement of the first optical axis CL1 in the vertical direction due to rotational movement of the second optical axis CL2 by the vertical shift mechanism 101, and to project the projection image at an invariably constant height. It is possible to eliminate the movement of the first optical axis CL1 in the horizontal direction due to the rotational movement of the second optical axis CL2 by the horizontal shift mechanism 102, and to invariably align the first optical axis CL1 as a projection optical axis with the center of the screen 15. One of the vertical shift mechanism 101 or the horizontal shift mechanism 102 may be omitted, and only the shift in the vertical direction or only the shift in the horizontal direction may be performed.

Sixth Embodiment

Figure 14:
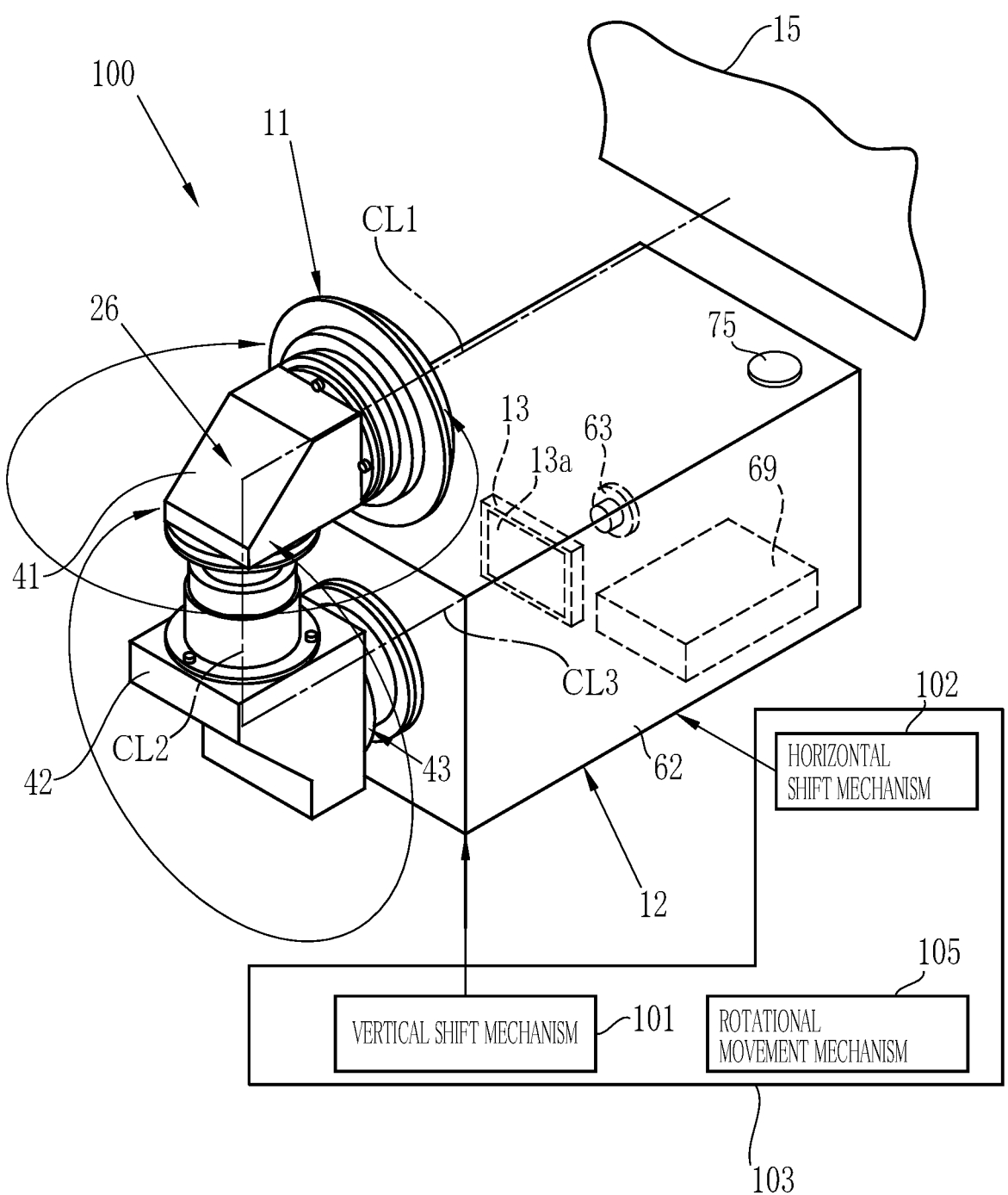
FIG. 14 is a perspective view showing a projector of a sixth embodiment that comprises a pedestal having a rotational movement mechanism.

In the sixth embodiment, although the pedestal 103 is moved up and down by the shift mechanisms 101 and 102, in addition, as shown in FIG. 14, the pedestal 103 may be rotationally moved around a vertical line centering on the second optical axis CL2 by a rotational movement mechanism 105. The rotational movement may be in increments of 90° or may be in increments of other angles. The rotational movement center of the pedestal 103 should not be aligned with the second optical axis CL2, and should be a vertical line parallel to the second optical axis CL2. The rotational movement may be performed manually in addition to motor drive. Instead of providing the rotational movement mechanism 105 in addition to the shift mechanisms 101 and 102, only the rotational movement mechanism 105 may be simply provided or the rotational movement mechanism 105 may be provided in the pedestal 103 having either of the shift mechanism 101 or 102. The rotational movement mechanism 105 is provided, whereby projection can be performed in all directions of a horizontal plane while the portrait screen or the landscape screen is maintained.

In the respective embodiments, although a transmissive liquid crystal panel is used as the image forming panel 13, a reflective liquid crystal panel may be used. In this case, the light source 63 is disposed on the front surface side of the image forming panel 13 to perform simultaneous irradiation of irradiation light of three colors of RGB. In a case where a DMD is used as the image forming panel 13, for example, the light source 63 is disposed on the front surface side of the image forming panel 13 to emit LED of three colors of RGB in a time-division manner in synchronization with a forming timing of a three-color image of the DMD.

In the respective embodiments, although description has been provided based on an example where the projector 10 is provided on a table, the invention can also be applied to a case where the projector is used while being suspended from a ceiling or the like. Furthermore, although an example where an image is projected onto the screen 15 has been described, a projection plane is not limited to the screen 15, and the projector can be used as a projector that projects an image on various projection planes.

In the respective embodiments, terms, such as perpendicular and parallel, have been used to represent a positional relationship between the plurality of optical axes or specific numerical values of an angle, such as 90°, have been used for description. However, the terms or the numerical values include a range to be allowed with an error based on accuracy required for the optical system.

In the respective embodiments, although the projector in which the projection optical system 11 is fixed to the housing 62 has been described, the projection optical system 11 may be attachably and detachably mounted in the projector body 12. In a case where an interchangeable projection optical system 11 is used, for example, a part of lenses of the first optical system 21, for example, the first lens 31 and the second lens 32 may be provided in the projector body, and the number of lenses on the projection optical system 11 side may be decreased.

EXPLANATION OF REFERENCES

10: projector
11: projection optical system
12: projector body
13: image forming panel
13*a*: image display surface
15: screen
21: first optical system
22: second optical system
23: third optical system
24: first mirror
25: second mirror
26: lens barrel
31: first lens
32: second lens
33: third lens
34: fourth lens
35: fifth lens
36: sixth lens
37: imaging plane
41: first holding barrel
41*a*: first lens frame
41*b*: second lens frame
41*c*: first mirror frame
42: second holding barrel
42*a*: connection barrel member
42*b*: second mirror frame
43: third holding barrel
43*a*: fourth lens frame
43*b*: flange
43*c*: fifth lens frame
44: first connection member
45: second connection member
46: inclined surface
47: connection barrel
50: inclined surface
51: connection barrel
55: first sensor
56: second sensor
62: housing
62*a*: lens mounting hole
63: light source
69: controller
70: image processing unit
71: image orientation determination unit
72: image memory
73: panel drive unit
74: light source drive unit
75: image orientation change button
76: table data
79: controller
80: projector
81: first motor
82: second motor
85: first switch
86: second switch
87: first motor drive unit
88: second motor drive unit
90: projector body
91: mount rotational movement unit
92: mount
96: projection optical system
97: second holding barrel
100: projector
101: vertical shift mechanism
102: horizontal shift mechanism
103: pedestal
105: rotational movement mechanism
CL1: first optical axis
CL2: second optical axis CL3: third optical axis
E0: original image
E1, E11 to E18: panel display image
E21 to E24, E31 to E38: screen projection image

What is claimed is:

1. A projector comprising:
   an image forming panel that displays an image based on an original image;
   a projection optical system that has, in order from a screen side, a first optical system, a first reflection member bending a first optical axis of the first optical system, and a second optical system, and projects the image displayed on the image forming panel onto a screen as a magnified image;
   a first connection member that connects the first optical system including the first reflection member to the second optical system to be rotationally movable around a second optical axis of the second optical system;
   a first sensor that detects a rotational movement state of the first optical axis of the first optical system around the second optical axis in the first connection member;
   a second reflection member that bends the second optical axis of the second optical system;
   a third optical system that is disposed on the image forming panel side from the second reflection member;
   a second connection member that connects the second optical system and the second reflection member to the third optical system to be rotationally movable around a third optical axis of the third optical system;
   a second sensor that detects a rotational movement state of the second optical axis of the second optical system around the third optical axis in the second connection member; and
   a controller that changes an orientation of a display image of the image forming panel based on the rotational movement state detected by the first sensor and the second sensor to make an orientation of a projection image on a projection plane match the original image.

2. The projector according to claim 1,
   wherein the first connection member regulates the rotation of the first reflection member and the first optical system in increments of a predetermined angle.

3. The projector according to claim 1,
   wherein the first connection member regulates the rotation of the first reflection member and the first optical system in increments of 90°.

4. The projector according to claim 1,
   wherein a reflection surface of each of the first reflection member and the second reflection member is a plane.

5. The projector according to claim 1,
   wherein the controller determines whether the display image is a vertically long portrait image or a horizontally long landscape image based on image orientation information to change an orientation of an image.

6. The projector according to claim 1,
   wherein the controller has an image orientation change input unit that inputs change of an image orientation.

7. The projector according to claim 1, further comprising:
   a projector body having the image forming panel; and
   a vertical shift mechanism that shifts the projector body in a vertical direction.

8. The projector according to claim 1, further comprising:
   a projector body having the image forming panel; and
   a horizontal shift mechanism that shifts the projector body in a horizontal direction.

9. The projector according to claim 3, further comprising:
   a projector body having the image forming panel; and
   a shift mechanism that shifts one or both of the image forming panel and the projection optical system in a direction perpendicular to the third optical axis.

10. The projector according to claim 1,
    wherein the projector is provided in a first installation mode that the second optical axis is arranged in the vertical direction or in a second installation mode that the third optical axis is arranged in the vertical direction according to the rotation using the second connection member, and
    wherein the controller performs a correction for changing the orientation of the projection image, in a different manner between the first installation mode and the second installation mode.

11. The projector according to claim 1,
    wherein the rotation of the first connecting member is regulated at a first position and a second position, and the second position is a position rotated by 90° about the second optical axis from the first position.

12. The projector according to claim 1,
    wherein in a case where the second optical system and the second reflection member are not rotated by the second connecting member and the first optical system and the first reflection member are rotated by 90° by the first connecting member, the direction of the long side of the display image is rotated by 90°.

* * * * *